United States Patent
Pfefferle

(10) Patent No.: US 7,343,971 B2
(45) Date of Patent: *Mar. 18, 2008

(54) METHOD FOR NATURAL GAS PRODUCTION

(75) Inventor: William C. Pfefferle, Madison, CT (US)

(73) Assignee: Precision Combustion, Inc., North Haven, CT (US)

( * ) Notice: Subject to any disclaimer, the term of this patent is extended or adjusted under 35 U.S.C. 154(b) by 183 days.

This patent is subject to a terminal disclaimer.

(21) Appl. No.: 11/216,239

(22) Filed: Aug. 30, 2005

(65) Prior Publication Data

US 2005/0284628 A1  Dec. 29, 2005

Related U.S. Application Data

(63) Continuation-in-part of application No. 10/891,548, filed on Jul. 15, 2004, now Pat. No. 6,973,968.

(60) Provisional application No. 60/489,876, filed on Jul. 22, 2003.

(51) Int. Cl.
*E21B 43/243* (2006.01)
(52) U.S. Cl. .................. 166/260; 166/272.6; 166/300
(58) Field of Classification Search ............... None
See application file for complete search history.

(56) References Cited

U.S. PATENT DOCUMENTS

| 4,687,491 | A |   | 8/1987  | Latty ........................ 44/51 |
|-----------|---|---|---------|--------------------------------------|
| 4,930,454 | A |   | 6/1990  | Latty et al. ............. 122/4 D   |
| 5,434,330 | A |   | 7/1995  | Hnatow et al. .......... 585/864     |
| 5,660,603 | A |   | 8/1997  | Elliot et al. ............ 48/127.5  |
| 5,950,732 | A |   | 9/1999  | Agee et al. ............. 166/354    |
| 6,733,573 | B2|   | 5/2004  | Lyon ........................ 95/153  |
| 6,973,968 | B2| * | 12/2005 | Pfefferle ................. 166/260   |
| 2003/0178195 | A1 |   | 9/2003 | Agee et al. ............. 166/248    |
| 2004/0200618 | A1 |   | 10/2004| Piekenbrock .......... 166/305.1     |

* cited by examiner

*Primary Examiner*—Zakiya W. Bates
(74) *Attorney, Agent, or Firm*—Robert L. Rispoli

(57) ABSTRACT

A method and system for dissociating methane hydrate deposits in-situ is provided wherein an oxidizer fluid and a supply of fuel, both at a pressure higher than that of the methane hydrate deposit, are supplied and delivered to the methane hydrate deposit. The fuel is combusted downhole by reacting it with the oxidizer fluid to provide combustion products. The combustion products are placed in contact with a diluent fluid to produce a heated product fluid. The heated product fluid is injected into the methane hydrate deposit whereby methane is dissociated from the methane hydrate and made available for extraction. In addition, carbon dioxide may be made available to promote the formation of carbon dioxide hydrates from the liberated methane hydrate water.

28 Claims, 1 Drawing Sheet

METHOD FOR NATURAL GAS PRODUCTION

CROSS-REFERENCE TO RELATED APPLICATION

This application is a continuation-in-part of U.S. patent application Ser. No. 10/891,548; filed Jul. 15, 2004, now U.S. Pat. No. 6,973,968; incorporated herein by reference, which application claimed the benefit of U.S. Provisional Application No. 60/489,876 filed Jul. 22, 2003.

BACKGROUND OF THE INVENTION

1. Field of the Invention

The present invention relates to a method for the production of natural gas from methane hydrate deposits. More particularly, the present invention is directed to the release of methane from methane hydrates.

2. Description of the Related Art

Methane hydrate deposits are abundant throughout the world and have been estimated to represent by far the greater portion of the world's fossil energy reserve. Within the United States alone, methane hydrates represent an estimated 200,000 Trillion cubic feet (Tcf) of the total 227,500 Tcf of known natural gas reserves. The methane hydrate deposits, occurring at great depths primarily in the oceans, dwarf the total known combined oil and non-hydrate gas reserves. With the United States largely dependent upon imported fuels, there is an urgent need for a method to economically produce natural gas from the abundant United States methane hydrate reserves. Unfortunately, it has not yet been demonstrated that methane can be recovered from dissociated methane hydrates economically.

For in-situ dissociation, three approaches exist. One method involves heating the methane hydrate. This requires only about ten percent of the trapped gas heating value, assuming no heat losses. However, it has been found that pumping a heated fluid from the surface to the methane hydrate deposit results in such high heat loss from transporting the heated fluid downhole that essentially all of the heating value of the recovered methane is consumed to supply the needed energy expended in the recovery process. For deep deposits, all the heat is lost in transit downhole. In-situ combustion would minimize such transit heat losses but would be difficult to establish in a hydrate bed and would result in undesirably high bed temperatures.

A second method for in-situ dissociation involves reducing the in-situ pressure to a value below the methane hydrate dissociation pressure. However, the dissociation energy must still be supplied to the formation. Consequently, the methane hydrate formation temperature decreases thereby requiring even lower pressures for dissociation or heating of the deposit. Accordingly, this approach typically requires mining the solid methane hydrates and pumping a slurry to the surface. Such a mining system has yet to be demonstrated to be economically feasible.

Another method for in-situ dissociation involves pumping carbon dioxide downhole to displace methane from the methane hydrates by formation of carbon dioxide hydrates. However, this method has not been demonstrated as feasible as the reaction is slow at the deposit temperatures. In addition, conditions in a stable hydrate bed are appropriate for the formation of new methane hydrate from methane and water. Again, it is important in this method to raise the temperature of the deposit to minimize the reformation of methane hydrates.

It has now been found that heat losses incurred in providing a heated fluid for injection downhole into a methane hydrate bed can be substantially reduced by combusting a fuel downhole within the well casing and tempering the temperature of the combustion product gases by adding fluid in sufficient quantity to produce a heated fluid of a desired temperature for injection into the hydrate bed. Further, if the fuel comprises a compound containing carbon, carbon dioxide is produced. Thus, heat released by carbon dioxide hydrate formation is available to supply a portion of the heat required for methane hydrate decomposition.

BRIEF SUMMARY OF THE INVENTION

The present invention is a method and system for dissociating methane hydrate deposits by downhole production of a heated fluid. The method comprises injecting combustion products containing carbon dioxide into a methane hydrate deposit whereby at least a portion of the deposit may be heated to the temperature at which methane hydrate decomposes at the prevailing pressure. By combustion of a carbonaceous fuel downhole, the heat losses involved in piping a heated fluid downhole are avoided. Further, because the combustion products contain carbon dioxide, a hydrate forming gas, at least a portion of the heat required for methane hydrate decomposition can be supplied by the heat of formation of carbon dioxide hydrates. This works because at a given pressure, carbon dioxide hydrate formation can occur at a slightly higher temperature than that for methane hydrate dissociation. By combining downhole combustion with carbon dioxide displacement of methane, the process energy required is significantly reduced. In the method of the present invention, carbon dioxide rich combustion products provide the heat necessary to heat the deposit to a temperature above the methane hydrate decomposition temperature but below the carbon dioxide hydrate formation temperature. Thus, carbon dioxide hydrate formation is enhanced and provides its heat of formation to supply at least a portion of the decomposition heat required for methane hydrate decomposition.

It also has been found that in addition to the carbon dioxide formed by fuel combustion, additional carbon dioxide can be supplied from the surface such as for sequestration as hydrate. Carbon dioxide can be part of a carbon dioxide—oxygen oxidizer stream, in admixture with the fuel gas, or as a diluent added to reduce the temperature of the combustion gases.

The ability to generate heat for methane hydrate dissociation downhole resolves the problem that has limited surface heat generation for transport downhole, namely, heat losses completely or almost completely consuming all of the energy value of the methane produced. Methane dissociation from the hydrate itself according to the present invention only requires approximately 10% of the energy content of the released methane. The present invention eliminates the transport heat losses primarily because the heated fluid is produced adjacent to the methane hydrate deposit.

Although it is often feasible and cost effective to use flame combustion, catalytic combustion provides a method for stabilizing combustion. Catalytic combustion offers the ability to operate without soot formation, even at stoichiometric ratios without excess oxygen. Further, the ability of catalytic combustion to operate across a wide flammability range simplifies control for a downhole hydrate heating system.

In one preferred embodiment of the present invention, methane is reacted in the presence of a catalyst using a fuel rich mixture of oxygen (or air), recirculated exhaust and, optionally, added diluent (e.g. $CO_2$ if available or water). The catalytic reaction products are typically mixed with an oxygen-containing stream and burned. The temperature of the final combustion products is adjusted to the desired level by addition of $CO_2$ or water before injection into the methane hydrate bed. The injected fluids heat the deposits to the methane hydrate dissociation temperature. This dissociation temperature is a self-limiting temperature for as long as methane hydrate remains since the dissociation reaction is endothermic. The dissociation temperature of methane hydrate is below the dissociation temperature of $CO_2$ hydrate, yet still hot enough for a relatively high rate of $CO_2$ hydrate formation from $CO_2$ and water, a reaction not requiring the direct displacement of methane from methane hydrate by $CO_2$.

The method of the present invention and a device corresponding thereto offer an energy efficient means of dissociating methane hydrate. One embodiment of the present invention comprising providing the energy released by $CO_2$ hydrate formation offers increased energy efficiency of such a means and system.

DETAILED DESCRIPTION OF THE INVENTION

Figure 1:
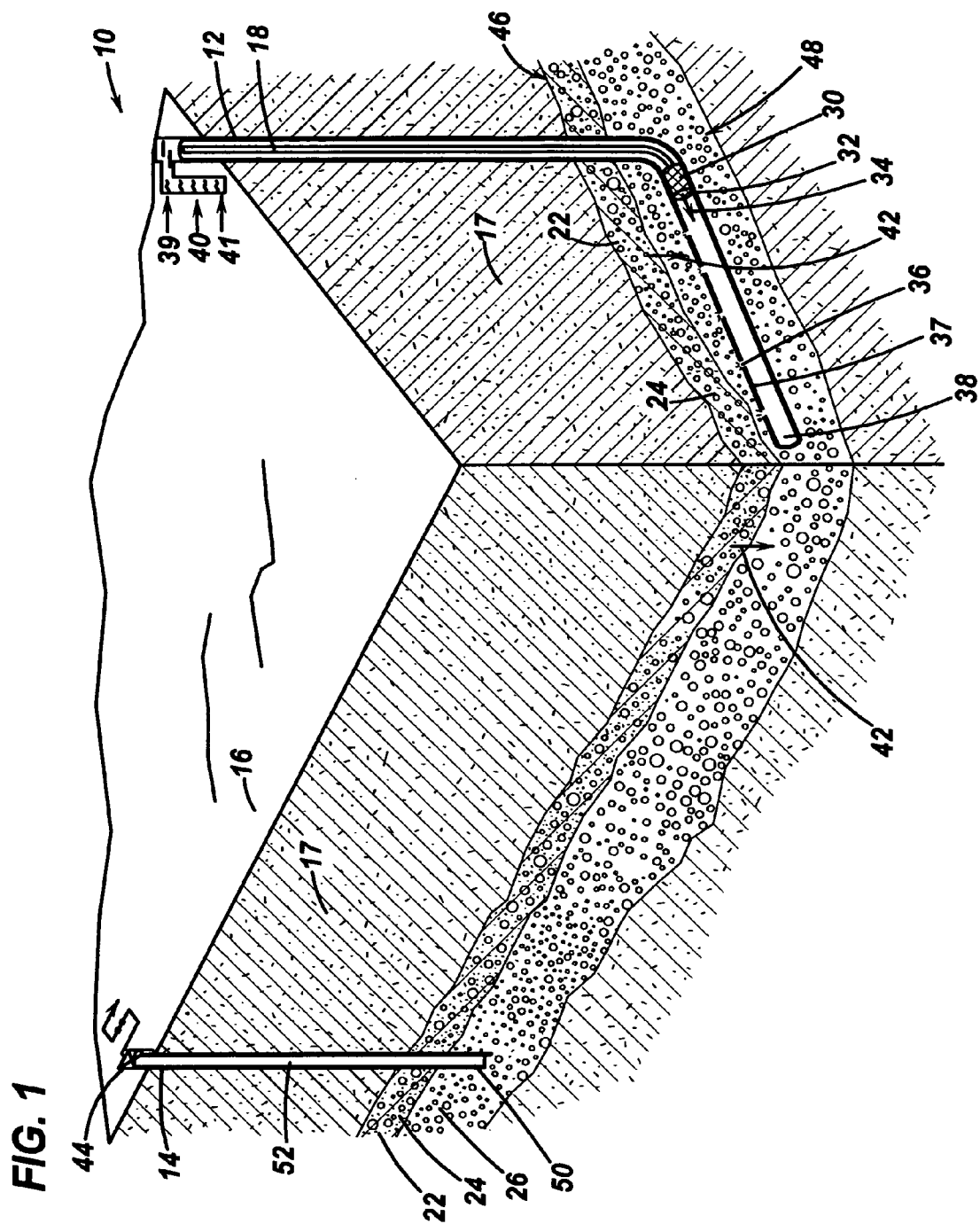
FIG. 1 depicts a diagrammatic representation of a methane production system according to the present invention.

As depicted in FIG. 1, a methane production system 10 according to the present invention comprises an injection well 12 and a production well 14. Injection well 12 and production well 14 are representative wellbores well known to one skilled in the oil and gas extraction art. Typically, the wellbores extend substantially downward from a point of access, for example, the surface 16 of a stratum 17. The wellbores also may extend substantially downward from the surface of a body of water, sediment deposit, permafrost, or other geological formation. In FIG. 1, injection well 12 and a production well 14 extend downward through stratum 17, through a hydrate formation bed 22 containing methane hydrates 24, and downward from hydrate formation bed 22 into a gas layer 26. As depicted in FIG. 1, injection well 12 is oriented substantially vertical extending downward through hydrate formation bed 22, and transitions to a substantially horizontal orientation 38 passing beneath and proximate to hydrate formation bed 22. Horizontal drilling of wellbores is well known to one skilled in the oil and gas extraction art.

Injection well 12 houses conduit bundle 18. Conduit bundle 18 generally comprises a plurality of separate channels for fuel 39, oxidant 40, and a diluent 41, and may include additional separate channels for instrumentation or other means or reactants desired downhole. The fuel 39, oxidant 40, and diluent 41 pass through conduit bundle 18 into a catalytic combustor 30. Diluent fluid provides cooling of combustor housing 32 and lowers the temperature of combustion products 34. The cooled combustion products 34 pass downstream of the catalytic combustor 30 and enter hydrate formation bed 22 through multiple apertures 36 in the wellbore walls 37 of injection well 12 downstream of catalytic combustor 30. As depicted in FIG. 1, combustion products 34 are introduced below hydrate formation bed 22. Heated methane hydrates 24 decompose and the resultant methane gas 42 migrates into the space beneath the bed forming gas layer 26, or into an existing gas layer 26. The methane gas flows toward production well 14 where natural gas is withdrawn through a flow controller 44 known in the art. Where hydrate formation bed 22 is non-horizontal, as is often the case, injection well 12 and production well 14 preferably are configured such that combustion products 34 are introduced proximate to lower portion 46 of hydrate formation bed 22. Liberated methane gas 42 flows generally upward from the lower portion 48 of gas layer 26 toward wellbottom 50 of production well 14.

In one preferred embodiment of the invention wherein methane is reacted in the presence of a catalyst using a fuel rich mixture of oxygen (or air), catalytic combustor 30 comprises a catalytic reactor disclosed in U.S. Pat. No. 6,394,791 (to Smith, et al.), incorporated herein by reference. In the third paragraph of the Summary of the Invention beginning at column 3, line 44, and in the first paragraph of the Detailed Description of the Invention beginning at column 9, line 43, the '791 patent teaches a basic method and apparatus wherein a fuel-rich fuel/air mixture is contacted with a catalyst to oxidize a portion of the fuel contained therein. The catalytic reaction provides both a heat of reaction and a product stream. The catalytic reaction product stream is typically mixed with an oxygen-containing stream and burned. Further, the ability of catalytic combustion to operate across a wide flammability range simplifies control for a downhole hydrate heating system. Such characteristics are described in columns 3-4 of the '791 patent.

A preferred embodiment of the catalytic reactor disclosed in the '791 patent, for use in a preferred embodiment of present invention, is described in the $18^{th}$ paragraph of the Summary of the Invention beginning at column 6, line 34 of the '791 patent. The method of operation disclosed does not require an ignition delay prior to complete inflammation. The combustion temperature at the stoichiometric interface between the product stream and the heated cooling fluid stream described therein is advantageously reduced. The '791 patent further discloses that by transferring sufficient heat from the fuel-rich product stream to the cooling air stream before contact, the adiabatic flame temperature at the stoichiometric interface between the product stream and the cooling air stream can be reduced to a value well below the adiabatic flame temperature that would exist at the stoichiometric interface in the absence of heat transfer between the streams. The characteristics of a catalytic reactor disclosed in the '791 patent would enhance a system of the present invention. The temperature of the final combustion products can be adjusted to the desired level by addition of $CO_2$ before injection into the methane hydrate bed. The $CO_2$ will make contact with the liberated water from a methane hydrate and form a $CO_2$ hydrate.

In another embodiment of the method of the present invention, nitrogen dilution of released methane can be avoided by using an admixture of $CO_2$ and oxygen rather than air as an oxidant. In addition to avoiding nitrogen dilution of the released methane, this embodiment provides a method for carbon dioxide sequestration. This in turn minimizes the high energy consumption required for gas compression. In contrast, pressurizing liquids is a very low energy consumption process. Thus, in this method of the present invention, liquid carbon dioxide may be pumped to a pressure sufficient for injection into the methane hydrate deposit. Similarly, liquid oxygen may be correspondingly pressurized; however, gaseous oxygen may be preferred since only about one fifth of the amount of gas need be compressed as compared to the amount of air that would need to be compressed. The high-pressure oxygen may be mixed with the high-pressure carbon dioxide to form an oxidizer admixture. Although oxygen and carbon dioxide can be delivered downhole via separate conduits, they can be mixed before delivery downhole. Methane or other fuel is delivered downhole, preferably through a separate conduit, and then reacted with the oxidant admixture to generate a heat of combustion and a heated product stream. Advantageously, the combustion temperature is in excess of that required for injection of heated fluids into the deposit. Thus, the combustion gases are mixed with additional fluid (preferably water and/or carbon dioxide) to produce a cooled fluid for injection into contact with the hydrate deposit at a temperature above the methane hydrate decomposition temperature.

Continuing with FIG. 1, combustion products 34 are made available proximate to hydrate formation bed 22 whereby methane hydrate 24 is dissociated both by thermal destabilization and by carbon dioxide displacement. The present invention takes advantage of the fact that at a given pressure, carbon dioxide hydrates can form at a temperature above the decomposition temperature of methane hydrates. Thus, the heat liberated by carbon dioxide hydrate formation is utilized to supply at least a portion of the heat required for the dissociation of the methane hydrate. Without the heat supplied by combustion, the temperature is too low for methane hydrate dissociation or for sufficiently rapid carbon dioxide hydrate formation by displacement of methane from methane hydrates. However, carbon dioxide may be reacted in the formation with water to form carbon dioxide hydrate and liberating the heat of reaction at a temperature above the methane hydrate stability temperature.

Dissociated methane 42 is then recovered from production well 14 where natural gas is withdrawn using methods known in the art. Typically, production well 14 comprises a conduit 52 in fluid communication with the dissociated methane 42 deposited in gas layer 26.

In the present invention, any combustion method known in the art may be used. Reaction by flame combustion is suitable provided the oxygen concentration of the oxidizer gas is sufficient to support a flame. Reaction in the presence of a catalyst allows combustion regardless of oxygen concentration and is an advantageous approach. Suitable conditions for both flame and catalytic combustion are well known in the art. Catalytic combustion has been demonstrated to be especially suited to downhole combustion of heavy oil as described in U.S. Pat. Nos. 4,930,454 and 4,687,491 to Latty et al. However, the rich/lean catalytic system offers the unique advantage for methane production from hydrates in that it has been found that rich catalytic reaction proceeds at a high rate even at the lowest temperatures encountered in hydrate deposits. This allows combustion of methane, the on site fuel, without preheating of fuel or oxidizer.

Catalytic combustion also offers the capability of combustion at temperature lower than typical flame temperatures thereby minimizing the possibility of over-heating the well piping and making it easier to control the temperature of the gases injected into the strata. This makes it suitable for use with either a vertical or a horizontal injection well. As is known in the art, formation fracturing may be used to improve distribution of the hot gases into the hydrate formation deposit. Use of vertical or horizontal production wells may be used as required.

Inasmuch as the high-pressure natural gas produced may contain carbon dioxide, as does much gas from conventional natural gas deposits, gas processing may be required. Advantageously, produced gas containing carbon dioxide may be used as fuel. Although conventional scrubbing technology may be used to produce pipeline quality natural gas, it is advantageous to remove carbon dioxide by carbon dioxide hydrate formation. By further compressing the gas, carbon dioxide hydrates may be formed by reaction with cold seawater from the ocean depths. Methods as those disclosed in U.S. Pat. No. 5,660,603 to Elliot, et al. and U.S. Pat. No. 5,434,330 to Hnatow, et al. may be used.

Although the invention has been described in considerable detail, it will be apparent that the invention is capable of numerous modifications and variations, apparent to those skilled in the art, without departing from the spirit and scope of the invention.

What is claimed is:

1. A method of dissociating methane hydrate deposits in-situ comprising:
   a) providing a supply of an oxidizer fluid at a pressure higher than that of the methane hydrate deposit;
   b) providing a supply of fuel at a pressure higher than that of the methane hydrate deposit;
   c) combusting the fuel downhole by reacting it with the oxidizer fluid to provide hot combustion products;
   d) contacting the combustion products with a diluent fluid to produce a cooled product fluid at a temperature higher than the prevailing methane hydrate decomposition temperature;
   e) injecting the cooled product fluid into contact with the methane hydrate deposit, and
   f) decomposing hydrate releasing natural gas.

2. The method of claim 1 wherein the fuel is combusted utilizing a catalytic combustor.

3. The method of claim 2 wherein the fuel is supplied in excess of the stoichiometric ratio.

4. The method of claim 3 wherein the fuel comprises methane, the combustion products comprise carbon dioxide, and the carbon dioxide in the cooled product fluid reacts to form carbon dioxide hydrate.

5. The method of claim 2 wherein the fuel is supplied in a stoichiometric ratio.

6. The method of claim 2 wherein the fuel is mixed with a portion of the oxidizer fluid to form a fuel rich mixture and the fuel rich mixture reacted in the presence of a catalyst prior to combustion with the remainder of the oxidizer admixture.

7. The method of claim 6 wherein the fuel comprises methane.

8. The method of claim 6 wherein the diluent fluid comprises water.

9. The method of claim 6 wherein the diluent fluid comprises carbon dioxide.

10. The method of claim 9 wherein the fuel comprises methane, the combustion products comprise carbon dioxide, and the carbon dioxide in the cooled product fluid reacts to form carbon dioxide hydrate.

11. The method of claim 10 including the additional step of recovering dissociated methane via a conduit in fluid communication with the dissociated methane.

12. The method of claim 10 wherein the cooled product fluid is injected at a lower elevation than said conduit.

13. The method of claim 1 wherein the diluent fluid comprises water.

14. The method of claim 1 wherein the diluent fluid comprises carbon dioxide.

15. The method of claim 14 wherein carbon dioxide reacts with water forming carbon dioxide hydrate and heat.

16. The method of claim 1 wherein the fuel comprises a hydrocarbon, the combustion products comprise carbon dioxide, and carbon dioxide in the cooled product fluid reacts with the methane hydrate deposits to form carbon dioxide hydrates releasing methane.

17. The method of claim 1 including the additional step of recovering dissociated methane via a conduit in fluid communication with the dissociated methane.

18. The method of claim 17 wherein the cooled product fluid is injected at a lower elevation than said conduit.

19. A method of dissociating methane hydrate deposits in-situ, comprising:
   a) providing a supply of oxygen at a pressure higher than that of the methane hydrate deposit;
   b) providing a supply of carbon dioxide at a pressure higher than that of the methane hydrate deposit;
   c) mixing oxygen with at least a portion of the carbon dioxide to form an oxidizer admixture;
   d) providing a fuel;
   e) reacting the fuel with the oxidizer admixture downhole to form a heat of reaction and hot combustion products containing carbon dioxide;
   f) contacting the combustion products with a diluent fluid to produce a cooled product fluid at a temperature higher than the prevailing methane hydrate decomposition temperature;
   g) injecting the cooled product fluid into contact with the methane hydrate deposit, and
   h) decomposing methane hydrate and liberating methane.

20. The method of claim 19 wherein the diluent comprises water.

21. The method of claim 20 wherein carbon dioxide reacts with water to form carbon dioxide hydrate and heat.

22. The method of claim 19 wherein the diluent comprises carbon dioxide.

23. The method of claim 22 wherein the diluent reacts with methane hydrate to produce carbon dioxide hydrate and methane.

24. The method of claim 19 wherein the fuel is mixed with a portion of the oxidizer admixture to form a fuel rich mixture and the fuel rich mixture reacted in the presence of a catalyst prior to combustion with the remainder of the oxidizer admixture.

25. The method of claim 24 wherein the fuel is methane.

26. The method of claim 25 including the additional step of recovering dissociated methane via a conduit in fluid communication with the dissociated methane.

27. The method of claim 19 wherein the fuel is reacted by gas phase flame combustion.

28. The method of claim 19 including the additional step of recovering dissociated methane via a conduit in fluid communication with the dissociated methane.

* * * * *